US011468152B2

(12) United States Patent
Li et al.

(10) Patent No.: US 11,468,152 B2
(45) Date of Patent: Oct. 11, 2022

(54) AUDIBLY PROVIDING INFORMATION DURING TELEPHONE CALL

(71) Applicant: Lenovo (Singapore) Pte. Ltd., Singapore (SG)

(72) Inventors: Scott Wentao Li, Cary, NC (US); Igor Stolbikov, Apex, NC (US); Jixin Feng, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 297 days.

(21) Appl. No.: 16/853,653

(22) Filed: Apr. 20, 2020

(65) Prior Publication Data

US 2021/0326419 A1  Oct. 21, 2021

(51) Int. Cl.
| | |
|---|---|
| *G10L 15/22* | (2006.01) |
| *G06F 21/32* | (2013.01) |
| *H04L 9/32* | (2006.01) |
| *G06F 3/16* | (2006.01) |
| *G06F 3/0488* | (2022.01) |
| *G10L 15/08* | (2006.01) |
| *G10L 13/00* | (2006.01) |

(52) U.S. Cl.
CPC .......... *G06F 21/32* (2013.01); *G06F 3/0488* (2013.01); *G06F 3/167* (2013.01); *G10L 13/00* (2013.01); *G10L 15/08* (2013.01); *G10L 15/22* (2013.01); *H04L 9/3231* (2013.01); *G10L 2015/088* (2013.01); *G10L 2015/223* (2013.01)

(58) Field of Classification Search
CPC ......... G10L 15/22; G10L 15/08; G10L 13/00; G10L 2015/223; G10L 2015/088; H04L 9/3231; G06F 3/167; G06F 21/32; G06F 3/0488; G06F 3/165

USPC .............................. 704/235, 260, 270, 270.1
See application file for complete search history.

(56) References Cited

U.S. PATENT DOCUMENTS

| | | | | |
|---|---|---|---|---|
| 7,317,714 B2 * | 1/2008 | Roberts | ............... | H04M 3/4281 379/93.35 |
| 7,451,921 B2 * | 11/2008 | Dowling | ............. | H04M 7/0078 455/461 |
| 7,474,741 B2 * | 1/2009 | Brunson | ............. | H04L 65/4015 455/412.2 |
| 8,014,760 B2 * | 9/2011 | Forstall | ................. | H04M 1/576 455/412.2 |

(Continued)

*Primary Examiner* — Vijay B Chawan
(74) *Attorney, Agent, or Firm* — John M. Rogitz; John L. Rogitz

(57) ABSTRACT

In one aspect, a first device may include at least one processor, a touch-enabled display accessible to the at least one processor, and storage accessible to the at least one processor. The storage may include instructions executable by the at least one processor to facilitate, at the first device, a telephone call with a second device. The instructions may also be executable to, during facilitation of the telephone call, present a graphical user interface (GUI) on the touch-enabled display. The GUI may include a selector that is selectable to command the first device to audibly provide, from the first device to the second device, information as part of the telephone call. The instructions may also be executable to receive user input selecting the selector and to, responsive to receipt of the user input selecting the selector, audibly provide the information to the second device as part of the telephone call.

20 Claims, 6 Drawing Sheets

(56) References Cited

U.S. PATENT DOCUMENTS

| | | | | |
|---|---|---|---|---|
| 8,059,788 B2* | 11/2011 | Allen, Jr. | ............... | H04M 3/08 |
| | | | | 379/27.04 |
| 8,082,523 B2* | 12/2011 | Forstall | ............... | G06F 3/04883 |
| | | | | 715/788 |
| 9,304,736 B1* | 4/2016 | Whiteley | ............... | G06F 3/167 |
| 9,542,050 B2* | 1/2017 | Monney | ............... | G06F 3/0202 |
| 9,582,111 B2* | 2/2017 | Rouaissia | ............ | G06F 3/04182 |
| 9,864,576 B1* | 1/2018 | Liu | ............... | G06F 1/325 |
| 10,147,441 B1* | 12/2018 | Pogue | ............... | G06F 3/167 |
| 10,334,119 B2* | 6/2019 | Freeman | ............... | H04W 4/16 |
| 10,425,536 B2* | 9/2019 | Paolini-Subramanya | ............... | |
| | | | | H04M 3/54 |
| 10,515,653 B1* | 12/2019 | Pogue | ............... | G06F 3/167 |
| 10,536,819 B2* | 1/2020 | Forstall | ............... | H04W 4/16 |
| 10,878,836 B1* | 12/2020 | Pogue | ............... | G06F 3/167 |
| 2010/0251127 A1* | 9/2010 | Geppert | ............... | H04L 51/046 |
| | | | | 709/228 |

* cited by examiner

AUDIBLY PROVIDING INFORMATION DURING TELEPHONE CALL

FIELD

The present application relates to technically inventive, non-routine solutions that are necessarily rooted in computer technology and that produce concrete technical improvements.

BACKGROUND

As recognized herein, telephone communication sometimes requires that a user provide sensitive information to a person on the other end of the call. This might be the case if the user is calling his or her insurance carrier, a vendor, technical support for a service to which the user subscribes, etc. However, as also recognized herein, in these situations the user might not be in a private place at which the sensitive information can be spoken without being overheard by others or picked up by electronic recording devices. There are currently no adequate solutions to the foregoing technological problem.

SUMMARY

Accordingly, in one aspect a first device includes at least one processor, a touch-enabled display accessible to the at least one processor, and storage accessible to the at least one processor. The storage includes instructions executable by the at least one processor to facilitate a telephone call with a second device and to, during facilitation of the telephone call, present a graphical user interface (GUI) on the touch-enabled display. The GUI includes a selector that is selectable to command the first device to execute text to speech software to audibly provide, from the first device to the second device, information as part of the telephone call. The information is associated with the selector. The instructions are also executable to receive user input selecting the selector and to, responsive to selection of the selector, execute the text to speech software to audibly provide, from the first device to the second device the information as part of the telephone call.

The information may include one or more of a social security number, bank information, a credit card number, a date of birth, a passcode, and/or password. Also note that in some examples, the information may be stored in an encrypted storage area of the first device.

In some implementations, the instructions may be executable to analyze audio received from the second device, determine that a request for the information is indicated in the audio, and present the GUI responsive to the determination that the request for the information is indicated in the audio. The audio may be analyzed, for example, using one or more of a digital assistant and/or speech recognition software.

Also in some implementations, the GUI may be a first GUI and the instructions may be executable to analyze audio received from the second device, determine that a request for the information is indicated in the audio, and present a second GUI on the touch-enabled display responsive to the determination that the request for the information is indicated in the audio. The second GUI may prompt a user to provide data to authenticate the user. In these implementations, the instructions may then be executable to receive the data to authenticate the user, authenticate the user using the data, and present the first GUI on the touch-enabled display responsive to authenticating the user using the data. The data may include, for example, a passcode, a password, and/or biometric data such as fingerprint data, facial recognition data, or voice recognition data.

Additionally, in some implementations the user may be authenticated prior to facilitation of the telephone call, and the GUI may then be presented on the touch-enabled display during the telephone call based on the user being authenticated.

In another aspect, a method includes facilitating, at a first device, a telephone call with a second device. The method also includes presenting a graphical user interface (GUI) on a touch-enabled display of the first device during facilitation of the telephone call. The GUI includes a selector that is selectable to command the first device to audibly provide, from the first device to the second device, information as part of the telephone call. The method also includes receiving user input selecting the selector. The method then includes, responsive to receiving the user input selecting the selector, audibly providing, from the first device to the second device, the information as part of the telephone call.

Thus, in some implementations the selector may be selectable to command the first device to execute text to speech software to audibly provide, from the first device to the second device, the information as part of the telephone call. In these implementations, the method may include, responsive to receiving the user input selecting the selector, executing the text to speech software to audibly provide, from the first device to the second device, the information as part of the telephone call.

Additionally, in some examples the selector may indicate the type of information that will be audibly provided to the second device responsive to selection of the selector. The information itself may include, for example, a social security number, bank information, a credit card number, a date of birth, a passcode, and/or a password.

Still further, in some implementations the method may include analyzing audio received from the second device, determining that a request for the information is indicated in the audio, and presenting the GUI based on the determination that the request for the information is indicated in the audio.

In still another aspect, at least one computer readable storage medium (CRSM) that is not a transitory signal includes instructions executable by at least one processor to facilitate, at a first device, a telephone call with a second device. The instructions are also executable to, during facilitation of the telephone call, present a graphical user interface (GUI) on a touch-enabled display of the first device. The GUI includes a selector that is selectable to command the first device to audibly provide, from the first device to the second device, information as part of the telephone call. The instructions are also executable to receive user input selecting the selector and, responsive to receipt of the user input selecting the selector, audibly provide, from the first device to the second device, the information as part of the telephone call.

In some implementations, the GUI may be presented responsive to identification of a particular keyword as being spoken in audio received from the second device.

The details of present principles, both as to their structure and operation, can best be understood in reference to the accompanying drawings, in which like reference numerals refer to like parts, and in which:

DETAILED DESCRIPTION

Figure 1:
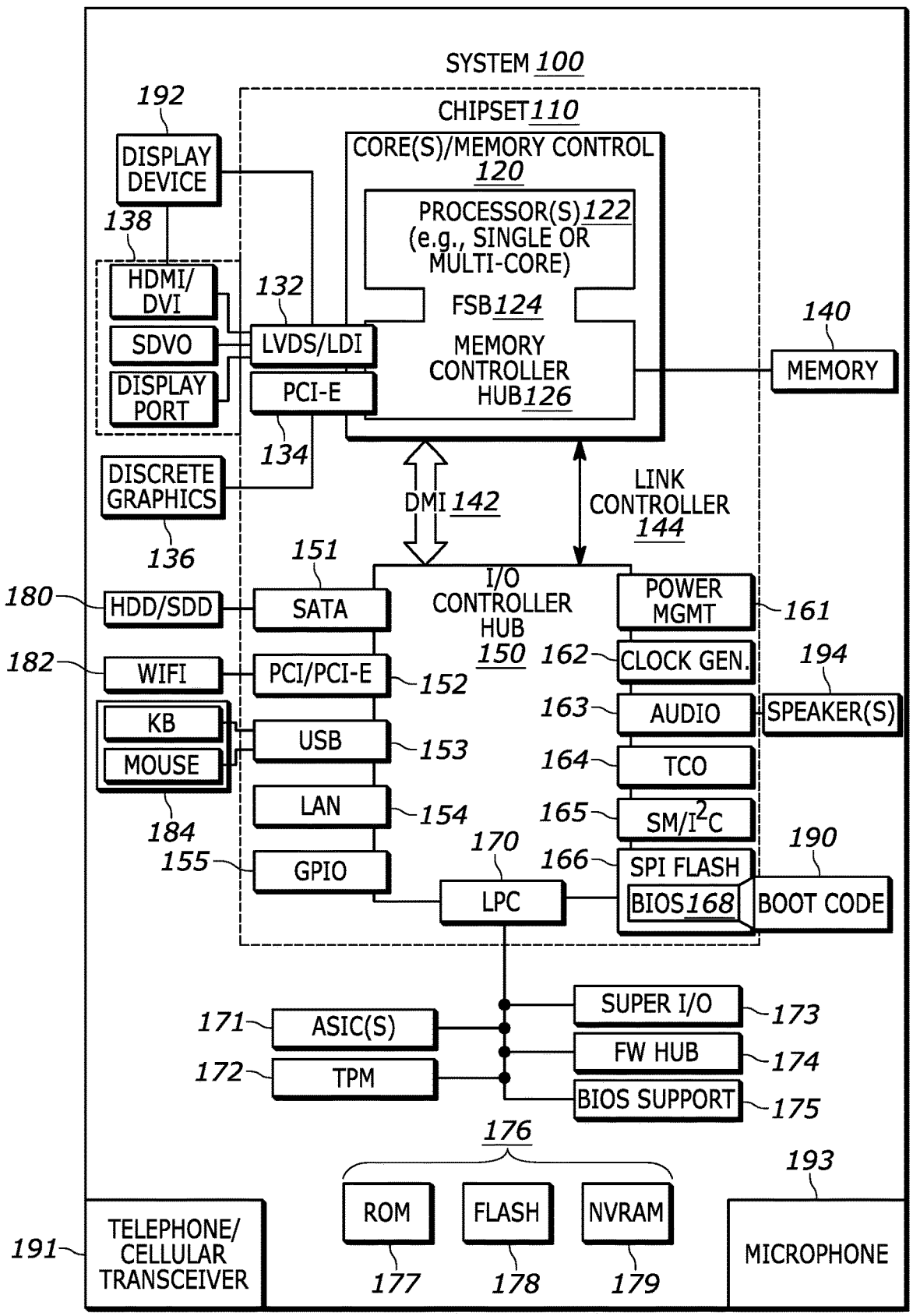
FIG. 1 is a block diagram of an example system consistent with present principles.

Consistent with present principles, sensitive information may be audibly provided by a device to a person on the other end of a telephone call, such as a person in a call center. That information might include a social security number for the user, a date of birth for the user, and/or a credit card number and associated credit card information (e.g., expiration month and year, code on the back of the card, billing address, etc.). The information itself may be stored securely (e.g., encrypted) and, in some examples, may only be accessed once the user's identity has been verified.

During the telephone call, a graphical user interface (GUI) may be presented to the user. Then when the information is to be audibly provided during the call, the user need not actually speak the information himself or herself. Instead, the user may press a button on the GUI which in turn may command the device to execute a text to speech engine that may be executing locally at the device (or remotely, in other examples). The engine can then access the voice channel of the telephone call to audibly provide the information as emulated speech to the person on the other end of the call.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio, e.g., as part of a telephone call), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a telephone transceiver 191 such as a cellular telephone transceiver for facilitating a telephone call consistent with present principles. However, also note that a telephone call may also be a voice over internet protocol (VoIP) telephone call that is facilitated using the network interface 154 consistent with present principles.

Still further, the system 100 may include an audio receiver/microphone 193 that may provide audible input from the microphone 193 to the processor 122 based on audio that is detected, such as via a user providing audible input to the microphone as part of a telephone call consistent with present principles.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. The system may also include a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video (e.g., as part of a video conference). Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
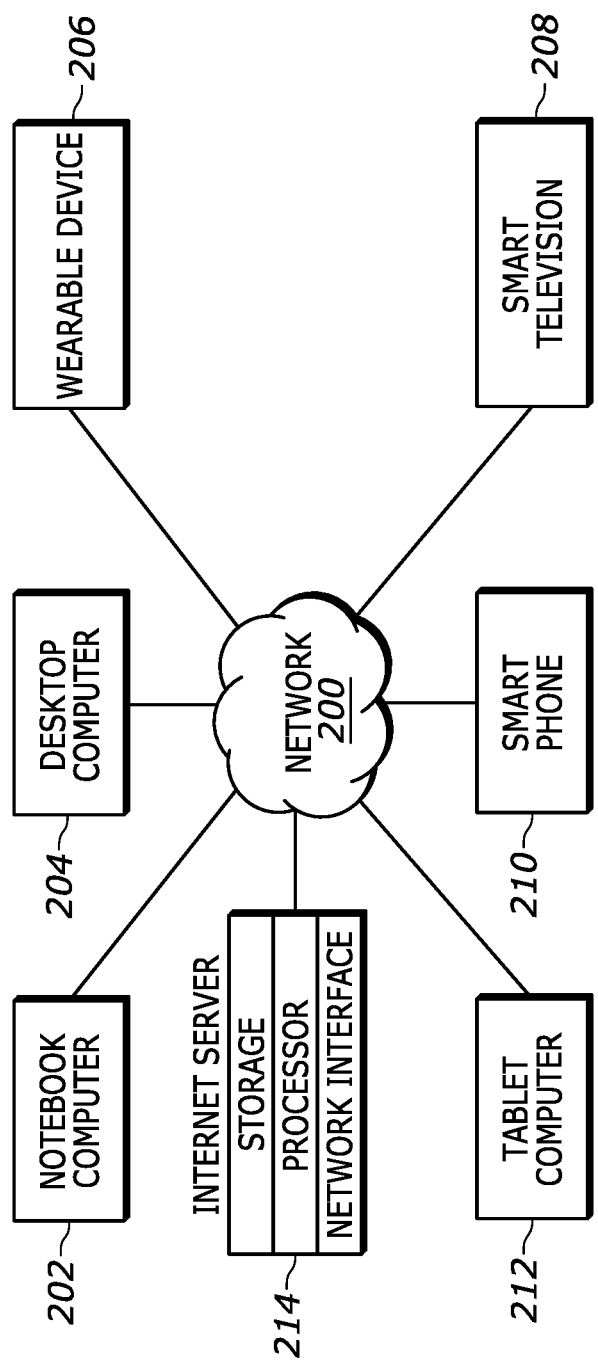
FIG. 2 is a block diagram of an example network of devices consistent with present principles.

Turning now to FIG. 2, example devices are shown communicating over a network 200 such as the Internet and/or telephone network (e.g., cellular network) in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
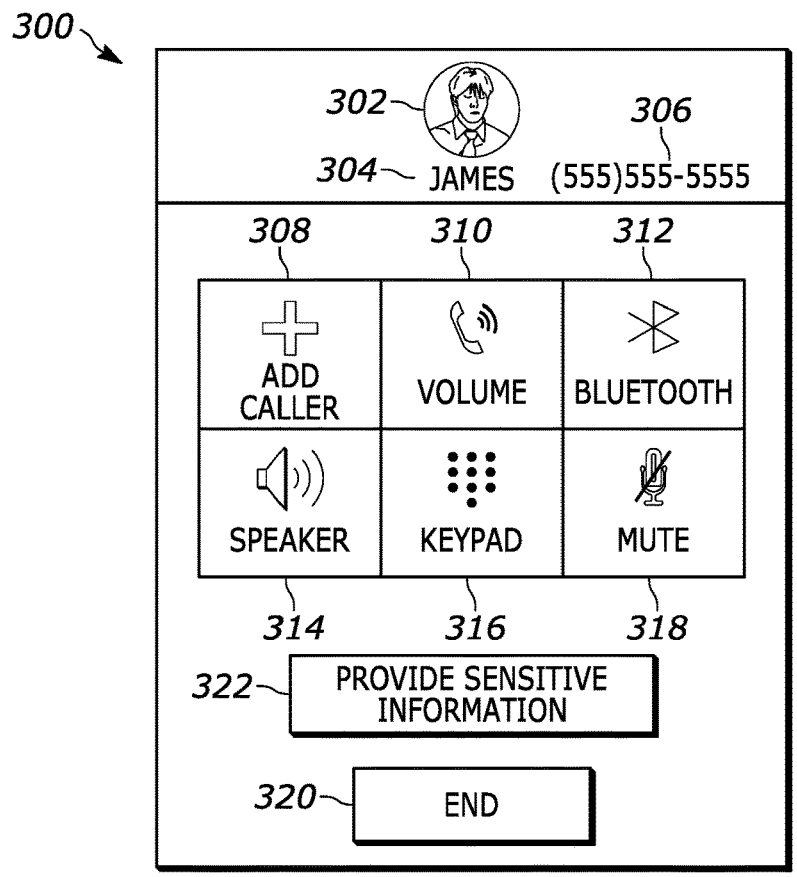
FIGS. 3-5 show various graphical user interfaces (GUIs) that may be presented at a device while the device facilitates a telephone call in order for a user to command the device to audibly provide sensitive information consistent with present principles.

Now describing FIG. 3, it shows an example graphical user interface (GUI) 300 that may be presented on the display of a first device while facilitating a telephone call consistent with present principles. The call may be between a user of the first device and a person using a second device. Thus, for example, the GUI 300 may be presented responsive to the first device connecting to the second device to initiate the telephone call, and/or responsive to the first device accepting the telephone call based on input from the user if the call were initiated by the second device.

As shown in FIG. 3, the GUI 300 presented at the first device during the call may include a profile picture 302, name 304, and phone number 306 for the person on the other end of the call. The GUI 300 may also include an "add caller" selector 308 that may be selectable to conference another device into the call, if desired. The GUI 300 may further include a call volume selector 310 that may be selectable to adjust the output volume of audio for the telephone call that is presented at the first device. Additionally, the GUI 300 may include a Bluetooth selector 312 that may be selectable to connect the first device to another Bluetooth device for the user to participate in the telephone call using both the first device and the other Bluetooth device (e.g., a Bluetooth speaker or Bluetooth headset).

As also shown in FIG. 3, the GUI 300 may include a speaker phone selector 314 that may be selectable to command the device to enter a speaker phone mode for the user to participate in the call using speaker phone. The GUI 300 may also include a keypad selector 316 that may be selectable to present a numeric keypad on the first device's display. Still further, the GUI 300 may include a mute selector 318 that may be selectable to mute the first device's microphone so that input provided to it is not transmitted to the second device as part of the call. Also note that an end selector 320 may be presented and may be selectable to end or conclude the telephone call.

FIG. 3 also shows that a selector 322 may be presented. In various implementations, the selector 322 may be selected to provide a command to the device to perform different functions consistent with present principles. For example, even if other elements shown on the GUI 300 are presented earlier, the selector 322 may be dynamically presented on the GUI 300 responsive to the first device identifying a request for certain information (such as a date of birth) indicated in audio from the second device, and then the selector 322 may be selectable by the user to command the first device to audibly provide the date of birth information corresponding to the request. Note that in this implementation, the specific information that may be audibly provided to the second device based on selection of the selector 322 may vary based on whatever information is identified by the first device as being requested by the person on the other end of the call, and is therefore not limited to only date of birth.

As another example implementation, the selector 322 may be selected to initiate an authentication process such as via the GUI 400 of FIG. 4, which will be described shortly. The selector 322 may be selectable to do so in this implementation regardless of whether the selector 322 is presented dynamically responsive to the first device identifying the request for certain information as described in the paragraph above, or whether the selector 322 is presented upon initial presentation of the rest of the GUI 300 during the telephone call for the user to then select it upon the user hearing the request for information from the other person.

Figure 5:
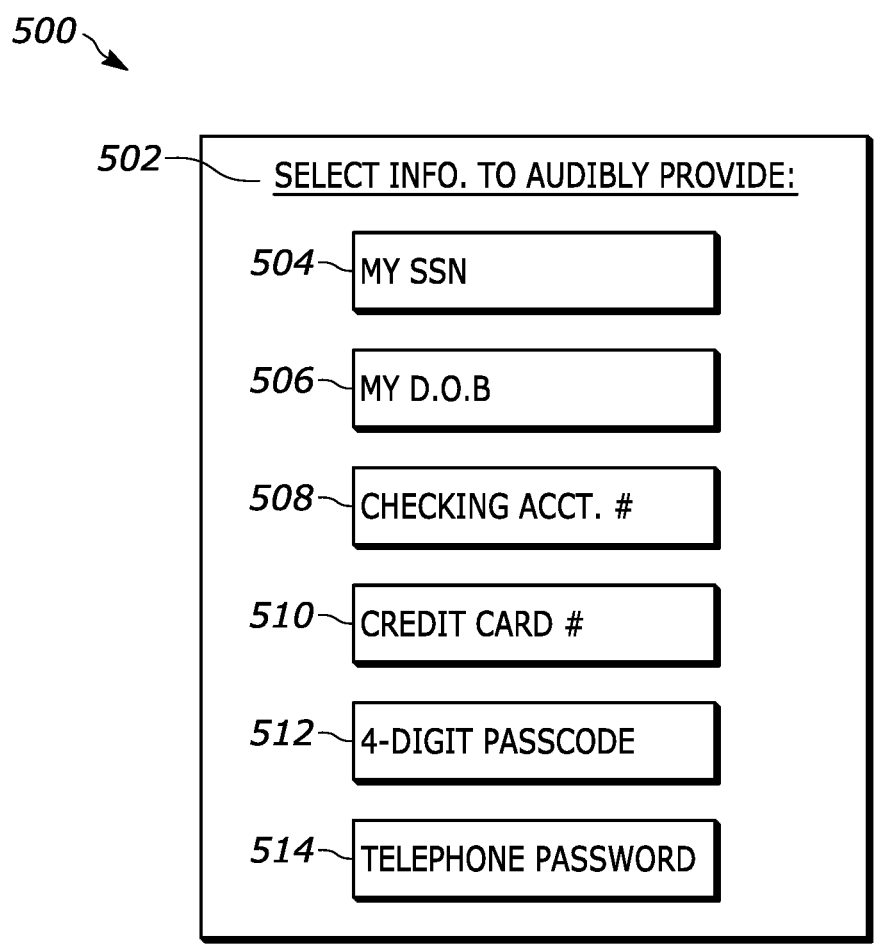

As yet another example implementation, the selector 322 may be selectable to command the first device to present the GUI 500 of FIG. 5, which will also be described shortly. The selector 322 may be selectable to do so in this implementation regardless of whether the selector 322 is presented dynamically responsive to the first device identifying the request for certain information as described above, or whether the selector 322 is presented upon initial presentation of the rest of the GUI 300 during the telephone call for the user to then select it upon the user hearing the request for information from the other person.

Figure 4:
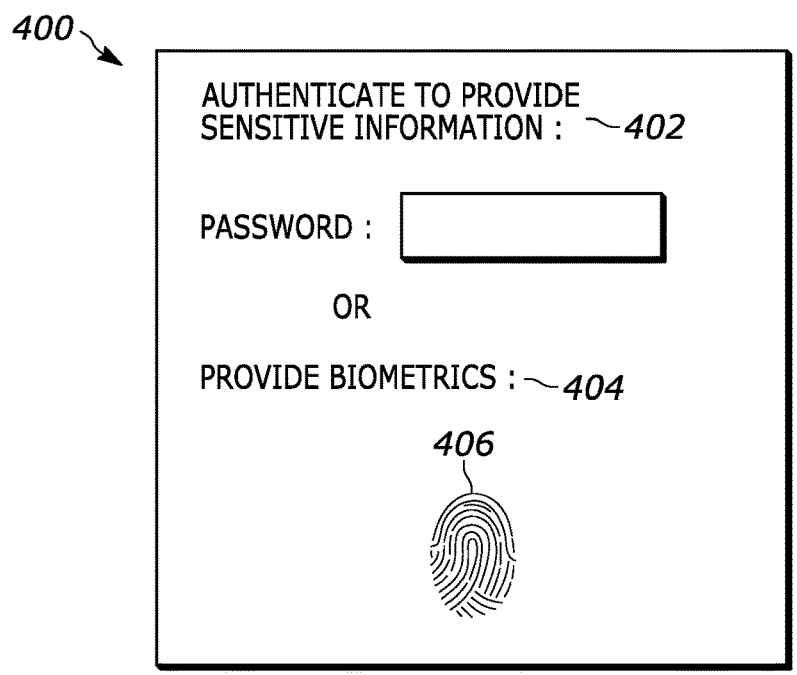

Now describing the aforementioned FIG. 4, note that in some but not all examples, the first device may require authentication of the user prior to the first device audibly providing the sensitive information to the second device in order to ensure that the user is authorized to provide the information. Thus, the GUI 400 of FIG. 4 may be presented as described above, may be presented dynamically responsive to the first device identifying a request for certain information indicated in audio from the second device as described above, and/or may be presented upon user request. In still other examples the GUI 400 may be presented prior to the first device initiating or accepting the telephone call for the user to authenticate himself or herself prior to participating in the telephone call.

As shown, the GUI 400 may include text 402 and other elements prompting the user to provide data to authenticate the user, such as a password entry box 404 at which the user may enter a password using a hard or soft keyboard. The GUI 400 may also include text 404 indicating that the user may provide biometric input to authenticate the user, such as fingerprint input which may be provided directly to the first device's touch-enabled display at the area 406 (that indicates a generic fingerprint) to in turn generate fingerprint data used by the first device to authenticate the user by matching the fingerprint data to prestored fingerprint data. The biometric input might also include presenting the user's face to a camera on the first device to in turn cause the camera to generate images or other facial recognition data to authenticate the user by matching feature points of the user's face to prestored feature point data. The biometric input might also include the user speaking predefined or random words into a microphone on the first device to generate voice recognition data that may be used to authenticate the user based on recognizing the user's voice using voice recognition. The user's voice may even be authenticated based on words the user has spoken as part of the telephone call itself (e.g., without even presenting the GUI 400).

Then responsive to successful authentication of the user, or responsive to other conditions described herein, the first device may present the GUI 500 of FIG. 5.

As shown, the GUI 500 may include a prompt 502 for the user to select a type of information to audibly provide to the second device as part of a telephone call. As shown in FIG. 5, each available type of information may be indicated in text on a respective selector 504-514. Each selector 504-514 may be selectable to provide a command to the first device to execute text to speech software to generate audio in the form of a voice that specifies through words the respective information associated with the respective selector. The generated voice may then be injected into the audio stream of the telephone call provided to the second device for the person on the other end of the line to audibly hear the information without the user actually having to speak the information himself or herself. For example, the voice generated by the first device to provide the information may be a generic computerized voice or may be a computer-generated voice that is trained to mimic the actual real-life voice of the user.

Also note that in some examples, only one of the selectors 504-514 may be dynamically presented at a given time on the GUI 500, depending on the respective selector being identified by the first device as corresponding to whatever information is identified as being requested by the person on the other end of the call.

Describing FIG. 5 in more detail, as shown the selector 504 may include text (or even a non-text graphic) indicating the type of information that will be audibly provided to the second device as part of the telephone call responsive to selection of the selector 504, which in this case is a social security number associated with the user. Similarly, the selector 506 may include text indicating that selection of the selector 506 will command the first device to audibly provide the user's date of birth as part of the telephone call. As also shown, the selector 508 may include text indicating that selection of the selector 508 will command the first device to audibly provide bank information such as a checking account number as part of the telephone call. Other types of bank information may also be provided, such as a bank routing number for the user's bank, a saving account number for the user, etc.

FIG. 5 also shows that the GUI 500 may include a selector 510 with text indicating that selection of the selector 510 will command the first device to audibly provide a credit card number for a credit card of the user as part of the telephone call. A selector 512 may also be presented that may include text indicating that selection of the selector 512 will command the first device to audibly provide a four-digit passcode as part of the telephone call, where the passcode would already be known to the person on the other end of the call for verification. As but one more example, a selector 514 may be presented that may include text indicating that selection of the selector 514 will command the first device to audibly provide a telephone password as part of the telephone call, where the password would already be known to the person on the other end of the call for verification.

Figure 6:
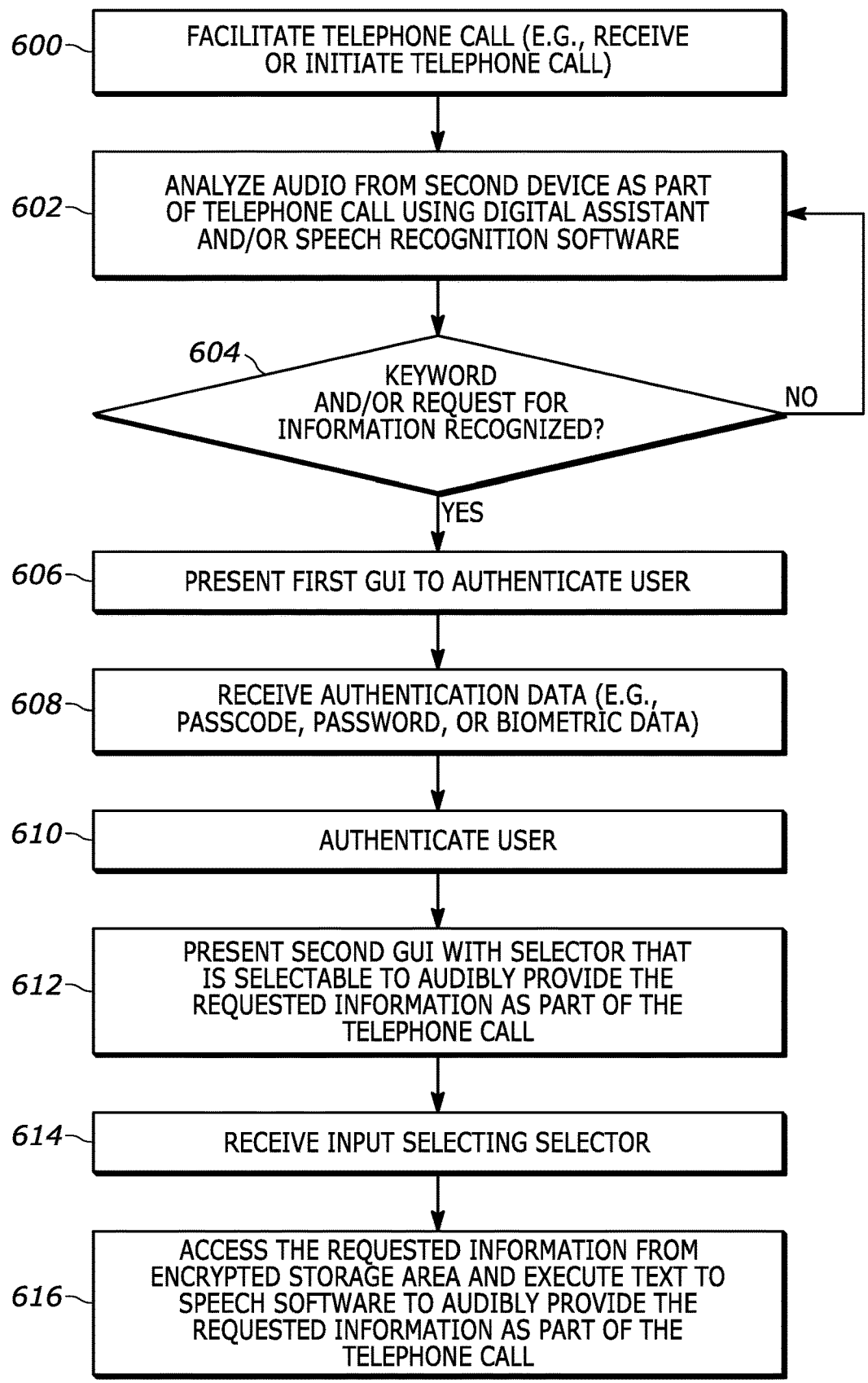
FIG. 6 is a flow chart of an example algorithm consistent with present principles.

Continuing the detailed description in reference to FIG. 6, it shows example logic that may be executed by a device such as the system 100 and/or the first device described above consistent with present principles. Beginning at block 600, the first device may facilitate a telephone call with a second device at least in part by receiving or initiating the call and then maintaining the connection.

The logic may then proceed to block 602 where the first device may analyze audio of the telephone call that is received from the second device as part of the telephone call. The audio that is received may be analyzed using speech recognition software and/or a digital assistant such as Google's Assistant, Apple's Siri, or Amazon's Alexa. From block 602 the logic may then proceed to decision diamond 604. At diamond 604 the first device may, based on the analysis at block 602, determine whether it has recognized a request or a keyword/key phrase in the audio from the second device that corresponds to a type of information to which the first device has access and can provide.

A negative determination at diamond 604 may cause the logic to revert back to block 602 and proceed therefrom. However, an affirmative determination may instead cause the logic to proceed to block 606. At block 606 the first device may present a first GUI on its touch-enabled display in order to authenticate the user. For example, at block 606 the first device may present the GUI 400 of FIG. 4.

From block 606 the logic may then proceed to block 608. At block 608 the first device may receive authentication data based on user input to the first device, such as a passcode, password, or biometric data that can be used to authenticate the user. Then at block 610 the first device may actually authenticate the user and then proceed to block 612. However, first note that if for some reason the user cannot be authenticated at block 610, then the logic may instead revert back to block 600 or 602 and proceed therefrom.

But assuming the logic continues to block 612, at this step the first device may update or present a second GUI on its touch-enabled display, where the second GUI may include one or more selectors that may be selectable to audibly provide information as part of the telephone call consistent with present principles. For example, at block 612 the GUI 300 of FIG. 3 may be updated to present the selector 322. As another example, at block 612 the GUI 500 of FIG. 5 may be presented.

From block 612 the logic may then proceed to block 614. At block 614 the first device may receive input selecting one of the selectors that was presented at block 612 (e.g., touch input). Then at block 616 the first device may, responsive to selection of the selector, access the requested information from an encrypted storage area accessible to the first device, such as an encrypted storage area of the first device's local storage or an encrypted storage area of a remotely-located server or cloud storage.

Also at block 616, the first device may execute text to speech software or a digital assistant to audibly provide the requested information to the second device as part of the telephone call. For example, audio generated from execution of the text to speech software to read aloud the associated information stored in the encrypted storage area may be injected into the audio stream of the telephone call that is being provided by the first device to the second device. As another example for some classes of devices that might not allow direct injection of audio during an active call, the first device may build up the call (e.g., a plain old telephone service (POTS) conference call) dynamically and host a local loopback call to emulate direct audio injection so that the audio indicating the sensitive information may still be transmitted to the second device as part of the telephone call. This will be discussed further in reference to FIG. 8.

Figure 7:
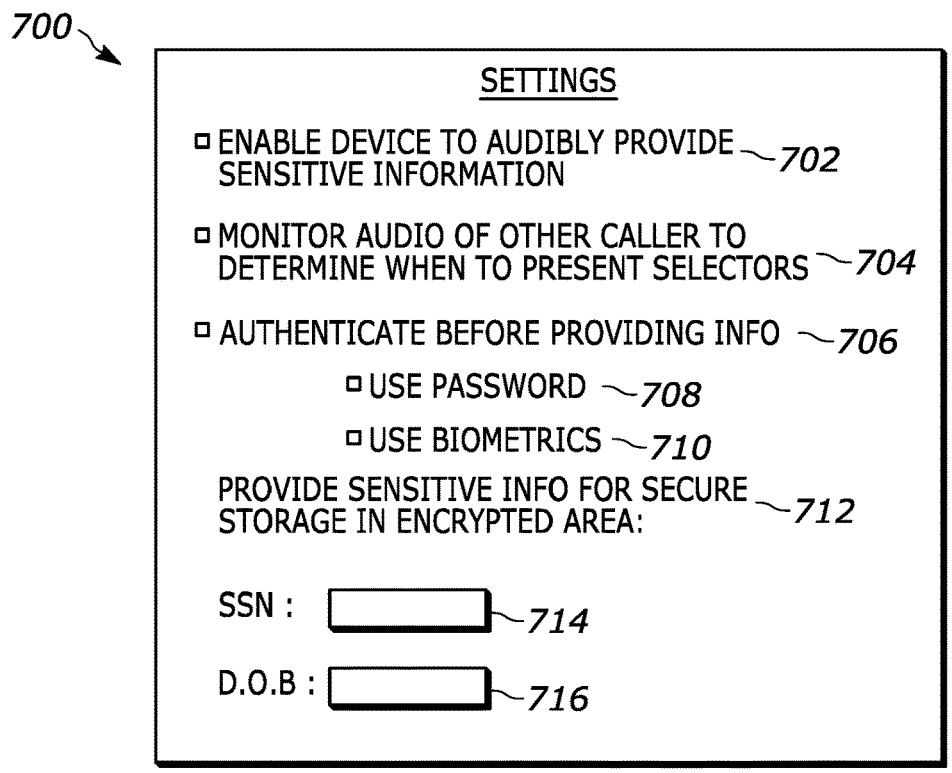
FIG. 7 shows an example GUI for configuring one or more settings of a device to undertake present principles.

However, FIG. 7 will be described first. As shown in FIG. 7, a GUI 700 may be presented on the display of the first device consistent with present principles. The GUI 700 may be presented upon user command in order to configure one or more settings of the first device to operate consistent with present principles. Note that each of the options or sub-options to be discussed below may be selected by directing touch or cursor input to the respective check box adjacent to the respective option or sub-option.

As shown in FIG. 7, the GUI 700 may include a first option 702 that may be selectable to set or configure the first device to audibly provide sensitive information as part of a telephone call consistent with present principles. For example, the option 702 may be selected to enable the device to, in the future, present the GUIs of FIGS. 3-5 and/or to execute the logic of FIG. 6.

The GUI 700 may also include an option 704 that may be selectable to set or configure the first device to specifically monitor and analyze audio of another person on a telephone call to identify requests for information to the user and/or to determine which selector(s) to present to ultimately provide such information consistent with present principles.

As also shown in FIG. 7, the GUI 700 may include an option 706 that may be selectable to set or configure the first device to authenticate the user prior to or during the telephone call before audibly providing information as part of the telephone call as described herein. If desired, a sub-option 708 may also be presented and be selectable to use a password for authentication, while a sub-option 710 may be presented and be selectable to use biometric input for authentication.

FIG. 7 also shows that the GUI 700 may include one or more input fields 714, 716 at which a user may provide input using a hard or soft keyboard in order to provide different types of sensitive information to the first device for secure and/or encrypted storage so that the information may be audibly provided at a later time during a telephone call. For example, the user may direct input to field 714 to provide the user's social security number to the first device. The user may also direct input to field 716 to provide the user's date of birth to the first device. Though not shown for simplicity, still other input fields for other types of information may also be presented on the GUI 700, such as a field for a credit card number and a field for a checking account number.

Figure 8:
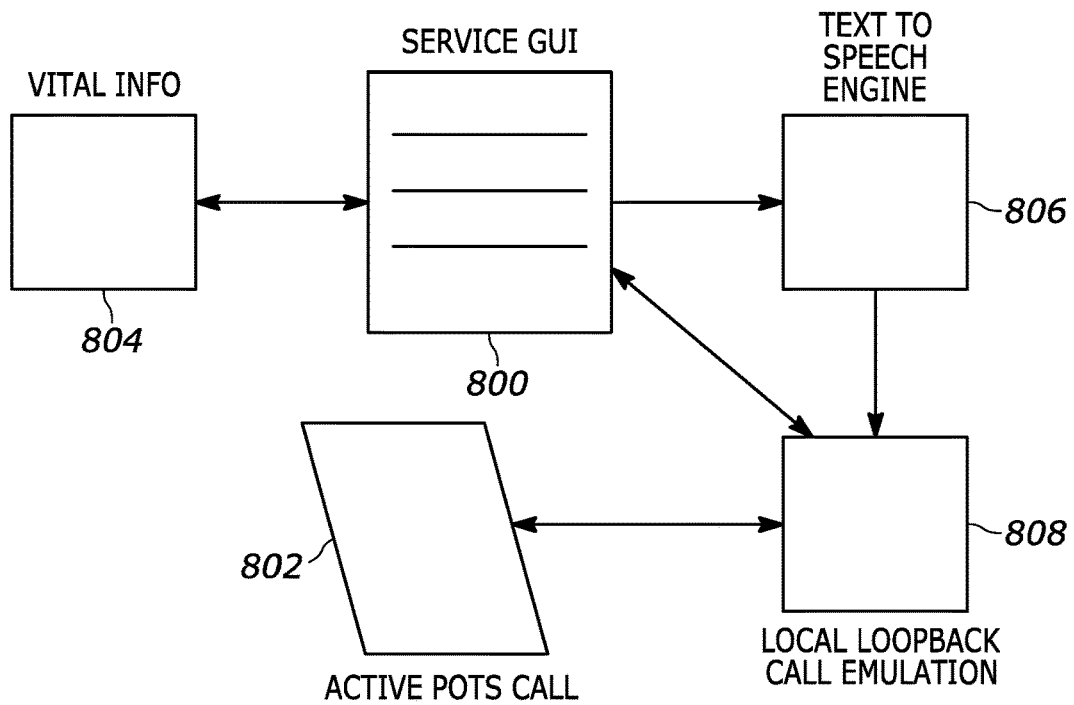
FIG. 8 shows a schematic diagram for injecting audio from a text to speech engine into a telephone call consistent with present principles.

Now describing FIG. 8, it shows a schematic diagram of a process that may be executed by a first device to audibly provide information to a second device even if the first device is of a class of devices that might not allow direct injection of audio during an active call. As shown, a service GUI 800 such as the GUI 300 or 500 from above may be presented during an active POTS call 802 in order to access "vital" or sensitive information 804 such as a social security number, date of birth, etc. so that this information may be entered into a text to speech engine 806. The text to speech engine 806 may then provide its output to local loopback call emulation module 808, which may also receive other information directly from the service GUI 800 in some examples. The module 808 may then execute local loopback call emulation using the output from the text to speech engine 806 in order to inject audio indicating the "vital" information 804 into the active POTS call 802.

Before concluding, note as mentioned above that in some examples sensitive information may be provided to a second device as part of a telephone call in a computerized voice that is trained to mimic the real-life voice of the user. To this end, an artificial intelligence model with one or more artificial neural networks may be used that have already been trained to output audio in the voice of the user. The model itself may be trained on voice samples of the user speaking random things or speaking specific things requested by the model in order to be trained. The trained model may then be stored locally at the user's device, or remotely at a server, for use by the first device at a later time. In some embodiments, the model may even be incorporated into the text to speech engine discussed above, though in other embodiments it may be separate and receive output from the text to speech engine in order to tailor the output to mimic the user's voice.

Also before concluding, it is to be understood that present principles may apply to not just POTS calls and VoIP audio telephone calls, but also to video conferencing calls and still other types of calls.

It may now be appreciated that present principles provide for an improved computer-based user interface that improves the functionality and ease of use of the devices disclosed herein, in addition to enhancing the security of telephone calls. The disclosed concepts are therefore rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
a touch-enabled display accessible to the at least one processor; and
storage accessible to the at least one processor and comprising instructions executable by the at least one processor to:
facilitate a telephone call with a second device;
analyze audio received from the second device;
determine that a request for information is indicated in the audio;
during facilitation of the telephone call and responsive to the determination that the request for the information is indicated in the audio, present a graphical user interface (GUI) on the touch-enabled display, the GUI comprising a selector that is selectable to command the first device to execute text to speech software to audibly provide, from the first device to the second device, the information as part of the telephone call, the information associated with the selector;
receive user input selecting the selector; and
responsive to selection of the selector, execute the text to speech software to audibly provide, from the first device to the second device, the information as part of the telephone call.

2. The first device of claim 1, wherein the information comprises a social security number.

3. The first device of claim 1, wherein the information comprises one or more of: bank information, a credit card number.

4. The first device of claim 1, wherein the information comprises a date of birth.

5. The first device of claim 1, wherein the information comprises a passcode or password.

6. The first device of claim 1, wherein the audio is analyzed using one or more of: a digital assistant, speech recognition software.

7. The first device of claim 1, wherein the GUI is a first GUI, and wherein the instructions are executable to:
based on determining that the request for information is indicated in the audio and prior to presenting the first GUI, present a second GUI on the touch-enabled display, the second GUI prompting a user to provide data to authenticate the user;
receive the data to authenticate the user;
authenticate the user using the data; and
responsive to authenticating the user using the data, present the first GUI on the touch-enabled display.

8. The first device of claim 7, wherein the data comprises a passcode or password.

9. The first device of claim 7, wherein the data comprises biometric data.

10. The first device of claim 9, wherein the biometric data comprises one or more of: fingerprint data, facial recognition data, voice recognition data.

11. The first device of claim 1, wherein the user is authenticated prior to facilitation of the telephone call, the GUI being presented on the touch-enabled display during the telephone call based on the user being authenticated.

12. The first device of claim 1, wherein the information is stored in an encrypted storage area of the first device.

13. The first device of claim 1, wherein the GUI indicates via text the type of information that will be audibly provided to the second device responsive to selection of the selector.

14. The first device of claim 1, wherein the instructions are executable to:
facilitate the telephone call with the second device by:
transmitting first audio from the first device to the second device for audible presentation at the second device; and
receiving second audio from the second device and audibly presenting the second audio at the first device.

15. A method, comprising:
facilitating, at a first device, a telephone call with a second device;
analyzing audio received from the second device;
determining that a request for the information is indicated in the audio;
during facilitation of the telephone call and based on the determination that the request for the information is indicated in the audio, presenting a graphical user interface (GUI) on a touch-enabled display of the first device, the GUI comprising a selector that is selectable to command the first device to audibly provide, from the first device to the second device, information as part of the telephone call;
receiving user input selecting the selector; and
responsive to receiving the user input selecting the selector, audibly providing, from the first device to the second device, the information as part of the telephone call.

16. The method of claim 15, wherein the selector GUI indicates via text the type of information that will be audibly provided to the second device responsive to selection of the selector.

17. The method of claim 16, wherein the selector indicates via text the type of information that will be audibly provided to the second device responsive to selection of the selector.

18. The method of claim 15, wherein the information comprises one or more of: a social security number, bank information, a credit card number, a date of birth, a passcode, a password.

19. At least one computer readable storage medium (CRSM) that is not a transitory signal, the computer readable storage medium comprising instructions executable by at least one processor to:
facilitate, at a first device, a telephone call with a second device;
during facilitation of the telephone call, present a graphical user interface (GUI) on a touch-enabled display of the first device, the GUI comprising a selector that is selectable to command the first device to audibly provide, from the first device to the second device, information as part of the telephone call;
receive user input selecting the selector; and
responsive to receipt of the user input selecting the selector, audibly provide, from the first device to the second device, the information as part of the telephone call;
wherein the GUI is presented responsive to identification of a particular keyword as being spoken in audio received from the second device.

20. The CRSM of claim 19, wherein the GUI comprises:
a first selector to inject first audio indicating a first type of information into the telephone call; and
a second selector to inject second audio indicating a second type of information into the telephone call, the first selector being different from the second selector, the first type of information being different from the second type of information.

* * * * *